United States Patent
Wang et al.

(10) Patent No.: US 12,062,811 B2
(45) Date of Patent: Aug. 13, 2024

(54) ELECTRODE SHEET AND SECONDARY BATTERY COMPRISING THE SAME

(71) Applicant: CONTEMPORARY AMPEREX TECHNOLOGY CO., LIMITED, Ningde (CN)

(72) Inventors: Xitong Wang, Ningde (CN); Daichun Tang, Ningde (CN); Xinxin Du, Ningde (CN); Honggang Yu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/105,725

(22) Filed: Feb. 3, 2023

(65) Prior Publication Data
US 2023/0223660 A1    Jul. 13, 2023

Related U.S. Application Data

(63) Continuation of application No. PCT/CN2021/121955, filed on Sep. 29, 2021.

(51) Int. Cl.
*H01M 4/00* (2006.01)
*H01M 4/04* (2006.01)
(Continued)

(52) U.S. Cl.
CPC ....... *H01M 50/491* (2021.01); *H01M 4/0404* (2013.01); *H01M 4/0471* (2013.01);
(Continued)

(58) Field of Classification Search
CPC ............. H01M 50/491; H01M 4/0404; H01M 4/0471; H01M 50/446; H01M 50/403;
(Continued)

(56) References Cited

U.S. PATENT DOCUMENTS

| 7,829,242 B2 | 11/2010 | Hörpel et al. |
| 8,105,733 B2 | 1/2012 | Hoerpel et al. |

(Continued)

FOREIGN PATENT DOCUMENTS

| CN | 101160677 A | 4/2008 |
| CN | 103311500 A | 9/2013 |

(Continued)

OTHER PUBLICATIONS

International Search Report and Written Opinion received in International Application PCT/CN2021/121955 on Apr. 26, 2022.

(Continued)

*Primary Examiner* — Nicholas P D'Aniello
(74) *Attorney, Agent, or Firm* — Kilpatrick Townsend & Stockton LLP

(57) ABSTRACT

An electrode sheet and a secondary battery comprising the same are provided. The electrode sheet comprises a current collector and an active material layer provided on at least one surface of the current collector. A first inorganic separation layer and a second inorganic separation layer are sequentially formed on the active material layer. The first inorganic separation layer comprises a plurality of pores having a diameter of 300 nm to 600 nm, and each of the plurality of pores extends from the first inorganic separation layer toward the second inorganic separation layer and penetrates through the second inorganic separation layer. The pore diameter of the pores in the second inorganic separation layer is uniform.

18 Claims, 3 Drawing Sheets

(51) Int. Cl.
*H01M 50/403* (2021.01)
*H01M 50/431* (2021.01)
*H01M 50/434* (2021.01)
*H01M 50/446* (2021.01)
*H01M 50/449* (2021.01)
*H01M 50/489* (2021.01)
*H01M 50/491* (2021.01)

(52) U.S. Cl.
CPC ....... *H01M 50/403* (2021.01); *H01M 50/431* (2021.01); *H01M 50/434* (2021.01); *H01M 50/446* (2021.01); *H01M 50/449* (2021.01); *H01M 50/489* (2021.01)

(58) Field of Classification Search
CPC . H01M 50/431; H01M 50/449; H01M 50/489
See application file for complete search history.

(56) References Cited

U.S. PATENT DOCUMENTS

| | | | |
|---|---|---|---|
| 8,163,441 B2 | 4/2012 | Hoerpel et al. | |
| 8,852,787 B2* | 10/2014 | Less | H01M 10/0525 429/129 |
| 9,553,293 B2 | 1/2017 | Nam et al. | |
| 10,122,002 B2 | 11/2018 | Kim et al. | |
| 2008/0032197 A1 | 2/2008 | Horpel et al. | |
| 2010/0000079 A1 | 1/2010 | Hörpel et al. | |
| 2010/0003401 A1 | 1/2010 | Hörpel et al. | |
| 2015/0010804 A1* | 1/2015 | Laramie | H01M 4/1395 429/144 |
| 2015/0050544 A1* | 2/2015 | Nam | H01M 50/457 429/144 |
| 2016/0211498 A1 | 7/2016 | Kim et al. | |
| 2019/0260001 A1 | 8/2019 | Min-Ji et al. | |
| 2020/0303707 A1 | 9/2020 | Zhou et al. | |
| 2020/0335814 A1* | 10/2020 | Lin | H01M 10/052 |

FOREIGN PATENT DOCUMENTS

| | | |
|---|---|---|
| CN | 104362289 A | 2/2015 |
| CN | 105811006 A | 7/2016 |
| CN | 104362289 B | 1/2017 |
| CN | 112635911 A | 4/2021 |

OTHER PUBLICATIONS

The extended European search report received in the corresponding European Application 21944415.5, mailed Feb. 2, 2024.

* cited by examiner

ELECTRODE SHEET AND SECONDARY BATTERY COMPRISING THE SAME

CROSS-REFERENCE TO RELATED APPLICATIONS

This application is a continuation of International Application PCT/CN2021/121955, filed Sep. 29, 2021 and entitled "ELECTRODE SHEET AND SECONDARY BATTERY COMPRISING THE SAME", which is incorporated herein by reference in its entirety.

TECHNICAL FIELD

The present application relates to the technical field of batteries, and in particular to an electrode sheet, a secondary battery comprising the same, a battery module, a battery pack and a powered device.

BACKGROUND ART

In recent years, with the increasing demand for clean energy, secondary batteries are widely used in energy storage power systems such as water power, thermal power, wind power and solar power stations, as well as power tools, vehicles, military equipment, aerospace and other fields. As the fields of application of secondary batteries are greatly widened, higher requirements are raised for their performances.

In a secondary battery, a separator serves to separate the positive and negative electrodes and allows the conduction of lithium ions, thus being an important part of the battery. Currently, a polyolefin-based separator material with a microporous structure, such as a single-layer or multi-layer film of polyethylene (PE) and polypropylene (PP), is commonly used in a commercially available secondary battery. A polyolefin separator can provide sufficient mechanical strength and chemical stability for use in secondary batteries, but it exhibits severe heat shrinkage under high temperature conditions. Such heat shrinkage leads to contact and short circuit between the positive and negative electrodes, thereby causing safety accidents such as fire, combustion and even explosion.

To this end, a technology is reported where the polyolefin separator for a secondary battery is modified by coating with an inorganic ceramic powder, that is, the thermal stability of the separator is improved by means of the high temperature thermal stability of ceramics. In addition, the battery performance such as cycling performance and discharge efficiency can also be improved by taking advantage of the good electrolyte wettability of the ceramic materials. Further, a technology is reported in which an inorganic separation layer such as a ceramic material is used as a separator to replace the conventionally used polyolefin-based separator. However, in such an inorganic separation layer, the pores formed by the gaps between inorganic particles in the inorganic separation layer tends to be blocked due to the dense packing of the inorganic particles. This reduces the uptake rate of the electrolyte solution by the inorganic separation layer and reduces the kinetic performance of the battery due to blockage of the ion-conducting channels. Moreover, although the thickness of such an inorganic separation layer is controllable, the overall weight cannot be ignored, or the mass-energy density of the battery will be seriously reduced.

SUMMARY OF THE INVENTION

Technical Problem

In order to overcome the above-mentioned problems such as a reduction in mass-energy density, a technology of forming pores in the inorganic separation layer is proposed. However, how to form pores suitable for use with batteries is an urgent problem to be solved. It is reported in the prior art that pores are formed by adding an etching sacrificial phase or ablative sacrificial phase (a substance that disappears during sintering) into an inorganic separation layer. However, such a pore-forming method tends to introduce new impurities or requires the large consumption of energy during the pore-forming process (for example, during the pore formation by sintering, the sintering temperature can be as high as 700° C. or more), and the high-temperature environment may cause adverse effects on various components such as the binder and additives contained in the electrode active material layer.

The present inventors find through intensive research that the pore formation can be performed by adding a substance capable of generating gas by conventional heating (e.g., a substance that decomposes upon heating) in a layer to be formed with pores. In such a pore-forming process, the generated gas will be combined into large bubbles during the escape process, which will push off the inorganic particles on both sides of the gap during the process of escaping through the gap between the inorganic particles, forming wedge-shaped pores. As a result, a channel through which lithium ions penetrate can be formed, thereby increasing the ionic conductivity of the inorganic separation layer. However, the present inventors find through further research that the shape and diameter of the pore are difficult to be controlled. Therefore, the shapes and diameters of the formed pores are not uniform, leading to non-uniform mechanical performances of the inorganic separation layer. As a result, defects such as cracks tends to occur when the electrode sheet is pressed or wound, easily causing decreased safety and capacity of the electrode. In addition, in the case where the thickness of the inorganic separation layer is made thinner to improve the mass-energy density, a battery having an inorganic separation layer with wedge-shaped pores is prone to self-discharge and even short circuit due to the large opening at one end of the pores.

Technical Solutions

The present invention is accomplished by the present inventors to solve the above-mentioned problems.

According to a first aspect of the present application, an electrode sheet is provided, which includes a current collector and an active material layer provided on at least one surface of the current collector.

A first inorganic separation layer and a second inorganic separation layer are sequentially formed on the active material layer.

The first inorganic separation layer comprises a plurality of pores having a diameter of 300 nm-600 nm.

Each of the plurality of pores extends from the first inorganic separation layer toward the second inorganic separation layer and penetrates through the second inorganic separation layer.

The diameter of the pores in the second inorganic separation layer is uniform.

In this aspect, by using an inorganic separation layer as a separator to replace the conventional polymer such as polypropylene separator, the manufacturing cost of batteries can be greatly reduced. Compared with the technology of using an inorganic separation layer not receiving pore formation as a separator, the mass-energy density of the battery can be significantly improved and the ionic conductivity of the inorganic separation layer are greatly increased in this embodiment by forming penetrating pores in the inorganic separation layer, thereby notably reducing the impedance of the battery. In addition, compared with the technology of forming wedge-shaped pores, in this embodiment, by forming a plurality of pores each extending from the first inorganic separation layer toward the second inorganic separation layer and penetrating through the second inorganic separation layer and having a diameter of 300 nm to 600 nm, problems caused by the wedge-shaped pores such as non-uniform mechanical performances of the inorganic separation layer, and tendency to self-discharge and even short circuit of the battery can be avoided.

According to any aspect of the present application, the sum of the thicknesses of the first inorganic separation layer and the second inorganic separation layer is 7 μm to 30 μm, thereby improving the mass-energy density of the battery and ensuring the insulation.

According to any aspect of the present application, the thickness of the first inorganic separation layer is 2 μm to 10 μm, whereby the plurality of pores extending from the first inorganic separation layer toward the second inorganic separation layer and penetrating through the second inorganic separation layer and having a relatively uniform diameter ranging from 300 nm to 600 nm are easily formed.

According to any aspect of the present application, each of the first inorganic separation layer and the second inorganic separation layer has a porosity of 40% to 55%, whereby the mass-energy density of the battery is improved, and the insulation and excellent mechanical performances are ensured.

According to any aspect of the present application, each of the first inorganic separation layer and the second inorganic separation layer comprises inorganic particles and a binder, whereby the self-discharge rate and impedance of the battery are ameliorated.

According to any aspect of the present application, the first inorganic separation layer comprises 90% to 95% by weight of inorganic particles and 5% to 10% by weight of a binder; and the second inorganic separation layer includes 95% to 98% by weight of inorganic particles and 2% to 5% by weight of a binder. Thereby, the mechanical performance and insulation of the electrode sheet are improved.

According to any aspect of the present application, the inorganic particles have a volume-based median diameter Dv50 of 30 nm to 500 nm, so that the mass-energy density of the battery is improved and the ionic conductivity of the electrode sheet is increased.

According to any aspect of the present application, the inorganic particles include at least one selected from the group consisting of silica, alumina, boehmite, magnesia, titania, zinc oxide, and magnesium aluminate oxide.

According to any aspect of the present application, the binder includes at least one selected from the group consisting of carboxymethyl cellulose, polyvinylidene fluoride, styrene butadiene rubber, polyimide, polyethylene, and polyvinylidene fluoride-hexafluoropropylene copolymer.

According to any aspect of the present application, the electrode sheet is a positive electrode sheet or a negative electrode sheet.

According to a second aspect of the present application, a secondary battery is provided, which includes an electrode sheet according to the first embodiment described above. Since the secondary battery includes the electrode sheet according to the first embodiment, the secondary battery has excellent mass-energy density as well as low self-discharge rate and resistance.

According to a third aspect of the present application, a battery module is provided, which includes the secondary battery according to the second embodiment of the present application. The battery module has excellent mass energy density as well as low self-discharge rate and impedance.

According to a fourth aspect of the present application, a battery pack is provided, which includes the battery module according to the third embodiment of the present application. The battery pack has excellent mass-energy density as well as low self-discharge rate and resistance.

According to a fifth aspect of the present application, a powered device is provided, which includes at least one selected from the secondary battery according to the second embodiment of the present application, the battery module according to the third embodiment of the present application, or the battery pack according to the fourth embodiment of the present application. The powered device has excellent mass energy density as well as low self-discharge rate and impedance.

According to a sixth aspect of the present application, a method for preparing an electrode sheet is provided, which includes the steps of:

(a) coating an active material layer on at least one surface of a current collector, (b) coating a slurry for forming a first inorganic separation layer on the active material layer, the slurry comprising first inorganic particles, a first binder, a first dispersant and a pore-forming agent, (c) drying the coated slurry for forming the first inorganic separation layer at a temperature lower than a pore-forming temperature of the pore-forming agent to remove 30 wt % to 60 wt % of the first dispersant, (d) coating a slurry for forming a second inorganic separation layer on the preliminarily dried first inorganic separation layer obtained after step (c), the slurry comprising second inorganic particles, a second binder and a second dispersant, and (e) thermally treating the product obtained after step (d) at the pore-forming temperature of the pore-forming agent to obtain the electrode sheet including the current collector, the active material layer, the first inorganic separation layer and the second inorganic separation layer.

The first inorganic separation layer comprises a plurality of pores having a diameter of 300 nm-600 nm.

Each of the plurality of pores extends from the first inorganic separation layer toward the second inorganic separation layer and penetrates through the second inorganic separation layer.

The diameter of the pores in the second inorganic separation layer is uniform.

According to the preparation method of the present application, it is possible to avoid the formation of wedge-shaped pores that occur when a pore-forming agent is added to a single-layer inorganic separation layer, and to form a plurality of pores each extending from the first inorganic separation layer toward the second inorganic separation layer and penetrating through the second inorganic separation layer and having a relatively uniform diameter ranging from 300 nm-600 nm. Therefore, the secondary battery including the electrode sheet of this embodiment has excellent mass energy density as well as low self-discharge rate and resistance.

According to any aspect of the present application, the contents of the first inorganic particles, the first binder, the first dispersant and the pore-forming agent in the slurry for forming the first inorganic separation layer are respectively 35 to 45 wt %, 1 to 4 wt %, 45 to 55 wt %, and 5 to 10 wt %.

The contents of the second inorganic particles, the second binder and the second dispersant in the slurry for forming the second inorganic separation layer are respectively 40 to 55 wt %, 1 to 5 wt %, and 40 to 55 wt %. Accordingly, the electrode sheet including the first inorganic separation layer and the second inorganic separation layer of this embodiment can be easily produced.

According to any aspect of the present application, the method further comprises a step of pressing after step (a) and/or step (e). By pressing the active material layer or the inorganic separation layer, the volume of the electrode sheet is reduced, thereby increasing the mass energy density of the battery.

According to any aspect of the present application, the sum of the thicknesses of the first inorganic separation layer and the second inorganic separation layer is 7 μm~30 μm. Thereby, the mass energy density of the battery is improved and the insulation is ensured.

According to any aspect of the present application, the thickness of the first inorganic separation layer ranges from 2 μm to 10 μm. Therefore, a plurality of pores each extending from the first inorganic separation layer toward the second inorganic separation layer and penetrating through the second inorganic separation layer and having a relatively uniform diameter ranging from 300 nm to 600 nm are easily formed.

According to any aspect of the present application, each of the first inorganic separation layer and the second inorganic separation layer has a porosity of 40% to 55%. As a result, the mass energy density of the battery is improved, and the insulation and excellent mechanical performances are ensured.

According to any aspect of the present application, the volume-based median particle diameter Dv50 of the first inorganic particles and the second inorganic particles may each be 30 nm to 500 nm. Therefore, the mass-energy density of the battery is improved and the ionic conductivity of the electrode sheet is increased.

According to any aspect of the present application, each of the first dispersant and the second dispersant comprises at least one selected from the group consisting of water, methanol, ethanol, n-propanol, isopropanol, acetone, and N-methylpyrrolidone. Thus, a slurry suitable for coating that is easy to operate and does not impair the battery performance can be easily formed during the preparation process.

According to any aspect of the present application, the pore forming agent includes at least one selected from the group consisting of ammonium carbonate and ammonium bicarbonate. As a result, uniform penetrating pores can be formed in the first inorganic separation layer and the second inorganic separation layer simply and conveniently at low temperature.

Beneficial Effects

The present application provides an electrode sheet, which can significantly improve the mass energy density of a battery and greatly increase the ionic conductivity of the inorganic separation layer by forming penetrating pores with relatively uniform pore diameter in the inorganic separation layer, thereby significantly reducing the impedance of the batter. In addition, compared with the technology of forming wedge-shaped pores, the electrode sheet is formed with a plurality of pores each extending from the first inorganic separation layer toward the second inorganic separation layer and penetrating through the second inorganic separation layer and having a pore diameter of 300 nm to 600 nm, so problems such as non-uniform mechanical performances of the inorganic separation layer, and tendency to self-discharge or even short circuit of the battery caused by the wedge-shaped pores can be avoided. Therefore, the secondary battery including the electrode sheet of the present application has excellent mass energy density as well as low self-discharge rate and resistance. In addition, the present application provides a battery module, a battery pack, and a powered device including the secondary battery. The battery module, battery pack, and powered device also have excellent mass energy density as well as low self-discharge rate and resistance.

Figure 1:
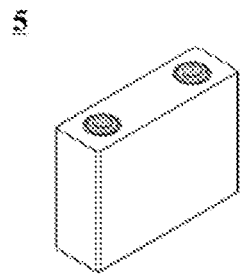
FIG. 1 is a schematic view of a secondary battery according to an embodiment of the present application.

LIST OF REFERENCE NUMERALS 1 battery pack; 2 upper box; 3 lower box; 4 battery module; 5 secondary battery; 51 case; 52 electrode assembly; 53 top cover assembly; 6 electrode sheet; 7 current collector; 8 active material layer; 9 first inorganic separation layer; 10 second inorganic separation layer; 11 pore; 12 wedge pore.

DETAILED DESCRIPTION

Hereinafter, the electrode sheet of the present application is described, where unnecessary detailed description may be omitted. For example, there are cases where detailed descriptions of well-known items and repeated descriptions of actually identical structures are omitted, to avoid unnecessary redundancy in the following descriptions and to facilitate the understanding by those skilled in the art. In addition, the following descriptions and embodiments are provided for fully understanding the present application by those skilled in the art, and are not intended to limit the subject matter recited in the claims.

Unless otherwise specified, all the embodiments and optional embodiments of the present application can be combined with each other to form new technical solutions.

Unless otherwise specified, all technical features and optional technical features of the present application can be combined with each other to form a new technical solution.

The electrode sheet, the secondary battery comprising the same, the battery module, the battery pack and the powered device are detailed below.

Figure 7:
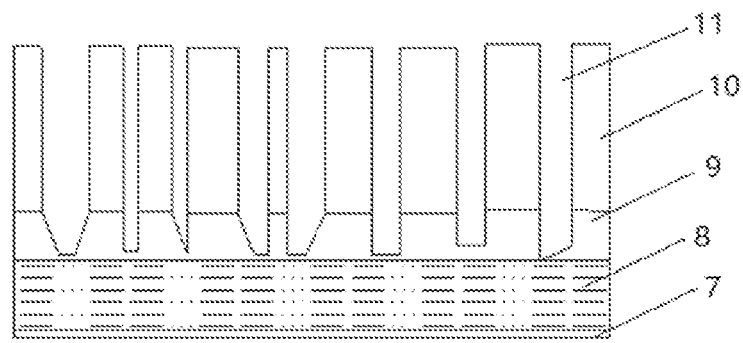
FIG. 7 is a schematic view of a battery module according to an embodiment of the present application.

In a first embodiment of the present application, an electrode sheet (see FIG. 7) is provided. The electrode sheet 6 includes a current collector 7 and an active material layer 8 provided on at least one surface of the current collector 7.

A first inorganic separation layer 9 and a second inorganic separation layer 10 are sequentially formed on the active material layer 8.

The first inorganic separation layer 9 includes a plurality of pores 11, and the diameter of the pores 11 is 300 nm-600 nm, The plurality of pores 11 each extend from the first inorganic separation layer 9 toward the second inorganic separation layer 10 and penetrate through the second inorganic separation layer 10.

The diameter of the pores 11 in the second inorganic separation layer 10 is uniform.

In this embodiment, by using an inorganic separation layer as a separator to replace a conventional polymer such as a polypropylene separator, the manufacturing cost of the battery can be greatly reduced (it is well known that polymers such as polyethylene film and polypropylene film as separators for batteries are is significantly greater in cost than the inorganic separation layer). Compared with the technology of using an inorganic separation layer not receiving pore formation as a separator, the mass-energy density of the battery can be significantly improved and the ionic conductivity of the inorganic separation layer are greatly increased in this embodiment by forming penetrating pores in the inorganic separation layer, thereby notably reducing the impedance of the battery.

Figure 8:
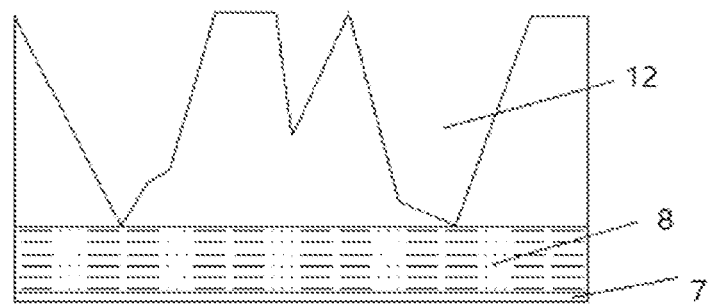
FIG. 8 is a schematic view of an electrode sheet formed with wedge-shaped pores.

In addition, in a pore formation process where pores are formed by adding a pore-forming agent to a single-layer inorganic separation layer as a separator, a generated gas will be combined into large bubbles during an escape process, which will push off the inorganic particles on both sides of a gap during the process of escaping through the gap between the inorganic particles, forming wedge-shaped pores (see FIG. 8). As mentioned above, the shape and diameter of such pores are difficult to control, so the shapes and diameters of the formed pores are not uniform, leading to non-uniform mechanical performances of the inorganic separation layer. As a result, defects such as cracks tends to occur when the electrode sheet is pressed or wound, easily causing decreased safety and capacity of the electrode. In addition, as described above, a battery having an inorganic separation layer with wedge-shaped pores is prone to self-discharge and even short circuit due to the large opening at one end of the pores.

In contrast, in the present application, pores are formed by adding a pore-forming agent in the first inorganic separation layer, where penetrating pores having relatively uniform pore diameter (300 nm-600 nm) are formed by the gas generated by the pore-forming agent in the first inorganic separation layer and the second inorganic separation layer, to significantly improve the mass energy density of the battery, and greatly increase the ionic conductivity of the inorganic separation layer, thereby significantly reducing the impedance of the battery, as described in detail below. In the present application, as described below, since no pore-forming agent is included in the second inorganic separation layer during the manufacturing process of the electrode sheet, no combination of bubbles occurs in this layer, so the diameter of the pores in the second inorganic separation layer is uniform. In the present application, the diameter of the pores being uniform means that the respective pore diameter of the pores does not vary greatly in the penetrating direction (i.e., non-wedge-shaped pores are formed). Specifically, the diameter of the pores being uniform means that in the penetrating direction, the respective maximum pore diameter of the pores is 1.3 times or less the minimum pore diameter.

Without adding a pore-forming agent, the diameter of the pores formed by the gap between the inorganic particles in the inorganic separation layer is generally less than 300 nm (about 200 nm). In contrast, in the present invention, the pores formed by adding the pore-forming agent have a pore diameter of 300 nm or more, and the pores penetrate through the first inorganic separation layer and the second inorganic separation layer. Therefore, the mass energy density of the battery can be significantly improved by reducing the mass of the inorganic separation layer, and the ionic conductivity of the inorganic separation layer is significantly improved by means of the penetrating pores with larger pore diameters, thereby significantly reducing the impedance of the battery. In addition, as described in detail below, by selecting the type of the pore-forming agent and controlling the pore-forming conditions (such as the heating temperature in the pore-forming process) and by adding the pore-forming agent only in the first inorganic separation layer (to prevent the pore-forming agent from generating a gas in the entire inorganic separation layer and thus combination of the gas to form large bubbles), the pore diameter of the penetrating pores can be controlled to be less than 600 nm. By controlling the pore diameter of the penetrating pores to be less than 600 nm, the problem of tendency to self-discharge or even short circuit of the battery due to large pore diameter can be prevented. Optionally, the pore diameter of the pores 11 is 300 nm-550 nm, 350 nm-500 nm, 300 nm-450 nm, 300 nm-4000 nm, or 350 nm-400 nm.

In the present application, the term "penetrating" means that the pores bring the two main surfaces of the inorganic separation layer into communication, and the path of the pores may be linear or curved. The term "penetrating" does not include the case where the two major surfaces of the inorganic separation layer are brought into communication by wedge-shaped pores. These penetrating holes in the inorganic separation layer can not only reduce the mass of the inorganic separation layer per unit volume to increase the mass energy density of the battery, but also provide a path of motion for active ions to significantly improve the ionic conductivity of the inorganic separation layer as a separator.

To improve the mass energy density of the battery and ensure the insulation, the sum of the thicknesses of the first inorganic separation layer and the second inorganic separation layer is 7 μm to 30 μm. Optionally, the sum of the thicknesses of the first inorganic separation layer and the second inorganic separation layer may be 8 μm to 25 μm, 9 μm to 23 μm, 10 μm to 20 μm, 12 μm to 18 μm or 15 μm to 20 μm.

When the sum of the thicknesses of the first inorganic separation layer and the second inorganic separation layer is 7 μm or more, the insulation of the inorganic separation layer as a separator can be better ensured, and the mass of the inorganic separation layer can be significantly reduced, to increase the mass energy density of the battery. When the sum of the thicknesses of the first inorganic separation layer and the second inorganic separation layer is 30 μm or less, the inorganic separation layer can function as a separator to separate the positive and negative electrodes without reducing the mass energy density of the battery. Therefore, the sum of the thicknesses of the first inorganic separation layer and the second inorganic separation layer of this embodiment falls within the above-mentioned range, so the mass energy density of the battery can be remarkably improved while ensuring the insulation.

To form a plurality of pores each extending from the first inorganic separation layer toward the second inorganic separation layer and penetrating through the second inorganic separation layer and having a relatively uniform diameter ranging from 300 nm to 600 nm easily, the thickness of the first inorganic separation layer may be 2 μm to 10 μm. Optionally, the thickness of the first inorganic separation layer may be 2 μm to 9 μm, 3 μm to 8 μm, 4 μm to 7 μm, 3 μm to 5 μm, 4 μm to 6 μm or 5 μm to 10 μm.

When the thickness of the first inorganic separation layer is less than 2 μm, the first inorganic separation layer is practically difficult to be achieved in process because of the low thickness. Moreover, when the thickness of the first inorganic separation layer is less than 2 μm, it is difficult to add a pore-forming agent uniformly in the layer, and bubbles that penetrate through the second inorganic separation layer are difficult to be formed in the pore-forming stage. Therefore, it is not easy to form a plurality of pores each extending from the first inorganic separation layer toward the second inorganic separation layer and penetrating through the second inorganic separation layer and having a relatively uniform pore diameter ranging from 300 nm to 600 nm. On the contrary, when the thickness of the first inorganic separation layer is greater than 10 μm, since the thickness of the inorganic separation layer containing the pore-forming agent is relatively large, the gas generated during the pore-forming stage is likely to be combined into large bubbles in this layer, so wedge-shaped pores tend to be formed in the first inorganic separation layer and the diameter of the pores formed in the second inorganic separation layer is relatively large. Therefore, problems such as non-uniform mechanical performances of the inorganic separation layer, and tendency to self-discharge and even short circuit of the battery are easily caused. Therefore, the thickness of the first inorganic separation layer according to this embodiment may fall into the above range, whereby a plurality of pores extending from the first inorganic separation layer toward the second inorganic separation layer and penetrating through the second inorganic separation layer and having a relatively uniform diameter ranging from 300 nm to 600 nm are easily formed. Therefore, the secondary battery including the electrode sheet of this embodiment has excellent mass energy density as well as low self-discharge rate and resistance.

To improve the mass energy density of the battery and ensure the insulation and excellent mechanical performances, each of the first inorganic separation layer and the second inorganic separation layer has a porosity of 40% to 55%.

The porosity of the inorganic separation layer not receiving pore formation reported in the prior art is about 35%. Therefore, in the present application, fine penetrating pores are formed in the inorganic separation layer by pore formation to increase the porosity of the inorganic separation layer to 40% or more. This improves the mass energy density of the battery and improves the ionic conductivity of the inorganic separation layer, thereby significantly reducing the impedance of the battery. Moreover, by controlling the porosity of the inorganic separation layer to be 55% or less, it is possible to ensure that the inorganic separation layer as a separator has excellent mechanical strength and the insulation is also ensured. Therefore, the porosity of the first inorganic separation layer and the second inorganic separation layer of this embodiment can fall within the above-mentioned range, whereby the mass energy density of the battery is improved, and the insulation and excellent mechanical performances are ensured.

In the present application, since the thickness of the first inorganic separation layer is very thin, and the total thickness of the two inorganic separation layers is substantially thin, it is difficult to measure the respective porosity of the two inorganic separation layers. Therefore, the porosity of the first inorganic separation layer and the second inorganic separation layer in the present application refers to the porosity of the two inorganic separation layers.

To ameliorate the self-discharge rate and the impedance of the battery, each of the first inorganic separation layer and the second inorganic separation layer comprises inorganic particles and a binder.

To improve the mechanical performances and insulation of the electrode sheet, the first inorganic separation layer may include 90% to 95% by weight of inorganic particles and 5% to 10% by weight of a binder; and the second inorganic separation layer may include 95% to 98% by weight of inorganic particles and 2% to 5% by weight of a binder.

In the present application, since a pore-forming agent is included in the first inorganic separation layer, the first inorganic separation layer may include more binder in an amount of 5 wt % to 10 wt % to avoid damage to the mechanical performances of the inorganic separation layer due to the pore formation in the pore-forming stage. In contrast, since the second inorganic separation layer contains no pore-forming agent, vacancies caused by the disappearance of the pore-forming agent will not occur in the layer during the pore-forming stage. Therefore, the binder may be present in a smaller amount of 2 wt % to 5 wt % in the second inorganic separation layer. The inorganic particles with a content in the above-mentioned range contained in the inorganic separation layer can improve the mechanical performances and insulation of the electrode sheet. Therefore, the contents of the inorganic particles and the binder in the first inorganic separation layer and in the second inorganic separation layer of this embodiment can respectively fall within the above ranges, whereby the mechanical performances and the insulation of the electrode sheet are improved.

In addition, in the present application, the first inorganic separation layer and the second inorganic separation layer may also contain other components such as fiber materials according to actual needs, to improve the mechanical performance and other performances of the inorganic separation layer.

To improve the mass-energy density of the battery and increase the ionic conductivity of the electrode sheet, the volume-based median particle diameter $Dv50$ of the inorganic particles may be 30 nm to 500 nm.

In the present application, the volume-based median particle diameter $Dv50$ of the inorganic particles can be determined by using a laser particle diameter analyzer (such as Malvern Master diameter 3000) with reference to the standard GB/T 19077.1-2016. The $Dv50$ is physically defined as follows. $Dv50$ is a particle diameter corresponding to the cumulative volume distribution percentage of inorganic particles reaching 50%.

When the volume-based median diameter Dv50 of the inorganic particles is less than 30 nm, the inorganic particles in the inorganic separation layer are likely to be densely packed, to block the pores in the inorganic separation layer easily. Therefore, when the volume-based median diameter Dv50 of the inorganic particles is less than 30 nm, the ionic conductivity of the electrode sheet may be poor. Furthermore, when the volume-based median diameter Dv50 of the inorganic particles is greater than 500 nm, the gaps between the inorganic particles in the inorganic separation layer are large, and it is difficult to form a plurality of fine channels with relatively uniform pore diameters of 300 nm to 600 nm. Therefore, the mass-energy density of the battery and the ionic conductivity of the electrode sheet cannot be improved. Therefore, the volume-based median diameter Dv50 of the inorganic particles in this embodiment falls within the above range, to improve the mass energy density of the battery and improve the ionic conductivity of the electrode sheet (thereby reducing the impedance of the electrode sheet).

In this embodiment, the inorganic particles include at least one selected from the group consisting of silica, alumina, boehmite, magnesia, titania, zinc oxide, and magnesium aluminate oxide. Optionally, the inorganic particles may include at least one selected from the group consisting of boehmite and magnesium aluminate oxide.

In this embodiment, the binder includes at least one selected from the group consisting of carboxymethyl cellulose, polyvinylidene fluoride, styrene butadiene rubber, polyimide, polyethylene, and polyvinylidene fluoride-hexafluoropropylene copolymer. Optionally, the binder may include at least one selected from the group consisting of carboxymethyl cellulose, polyvinylidene fluoride and styrene butadiene rubber.

In this embodiment, the types of the electrode sheet are not particularly limited. For example, the electrode sheet may be a positive electrode sheet or a negative electrode sheet.

According to a second embodiment of the present application, a secondary battery is provided, which includes an electrode sheet according to the embodiment described above. The secondary battery has excellent mass-energy density as well as low self-discharge rate and resistance.

A method for manufacturing the electrode sheet of the present application is described in detail below.

This embodiment provides a method for preparing an electrode sheet, which includes the following steps:

(a) coating an active material layer on at least one surface of a current collector, (b) coating a slurry for forming a first inorganic separation layer on the active material layer, the slurry comprising first inorganic particles, a first binder, a first dispersant and a pore-forming agent, (c) drying the coated slurry for forming the first inorganic separation layer at a temperature lower than a pore-forming temperature of the pore-forming agent to remove 30 wt % to 60 wt % of the first dispersant, (d) coating a slurry for forming a second inorganic separation layer on the preliminarily dried first inorganic separation layer obtained after step (c), the slurry comprising second inorganic particles, a second binder and a second dispersant, and (e) thermally treating the product obtained after step (d) at the pore-forming temperature of the pore-forming agent to obtain the electrode sheet including the current collector, the active material layer, the first inorganic separation layer and the second inorganic separation layer.

The first inorganic separation layer comprises a plurality of pores and the thickness of the first inorganic separation layer is 2 μm to 10 μm.

Each of the plurality of pores extends from the first inorganic separation layer toward the second inorganic separation layer and penetrates through the second inorganic separation layer.

The diameter of the pores in the second inorganic separation layer is uniform.

In step (a), the method of coating the active material layer on at least one surface of the current collector is not particularly limited, and a coating method commonly used in the art may be adopted. For example, the coating can be performed by applying the active material slurry on one surface of the current collector and then uniformly dispersing it using a doctor blade or the like. In addition, the coating method may further include various coating methods such as casting, comma doctor blade coating, screen printing, gravure coating, and the like.

In step (b), the method of coating the slurry for forming the first inorganic separation layer on the active material layer is not particularly limited, and a coating method commonly used in the art can be adopted. For example, the coating can be performed by applying the slurry for forming the first inorganic separation layer on the surface of the active material layer and then uniformly dispersing it using a doctor blade or the like. In addition, the coating method may include various coating methods described above.

In step (c), the method of drying the coated slurry is not particularly limited, as long as 30 wt % to 60 wt % of the first dispersant can be removed by drying at a temperature lower than the pore-forming temperature of the pore-forming agent. For example, the drying can be performed by various drying methods such as oven drying, infrared drying, and natural drying.

The pore-forming temperature of the pore-forming agent varies depending on the type of the pore-forming agent. For example, in the case of using ammonium bicarbonate as the pore-forming agent, the pore-forming temperature refers to the temperature at which ammonium bicarbonate begins to decompose. Ammonium bicarbonate begins to decompose slowly at 35° C. and is completely decomposed at 60° C. Therefore, in the case of using ammonium bicarbonate as the pore-forming agent, the thermal treatment temperature in step (c) needs to be lower than the temperature at which ammonium bicarbonate begins to decompose, that is, lower than 35° C. The purpose of thermal treatment in step (c) is to apply the slurry for forming the second inorganic separation layer on the partially dried first inorganic separation layer to avoid mixing of the two slurries. However, if the first inorganic separation layer is substantially completely dried (e.g., more than 60 wt % of the first dispersant is removed by drying), the gas generated during the pore forming stage is hard or impossible to push off inorganic particles in the first inorganic separation layer to form pores. On the contrary, if only less than 30 wt % of the first dispersant is removed, the two slurries tend to be mixed when the slurry for forming the second inorganic separation layer is applied on the first inorganic separation layer in step (d). Therefore, in step (c), 30 wt % to 60 wt % of the first dispersant is removed by thermal treatment to achieve partial drying of the first inorganic separation layer.

In step (d), the method of coating the slurry for forming the second inorganic separation layer on the first inorganic separation layer is not particularly limited, and a coating method commonly used in the art can be adopted. For example, the coating can be performed by uniformly coating the slurry for forming the second inorganic separation layer on the surface of the first inorganic separation layer by extrusion spraying. In addition, the coating method may include various coating methods described above.

In step (e), the product obtained after step (d) is thermally treated at the pore-forming temperature of the pore-forming agent, whereby pores are formed in the first inorganic separation layer and the second inorganic separation layer under the action of the pore-forming agent. The pore-forming temperature of the pore-forming agent refers to a temperature range in which the pore-forming agent can create pores in the inorganic separation layer by thermal decomposition or the like (for example, in the case of using ammonium bicarbonate as the pore-forming agent, the pore-forming temperature is 40° C. to 60° C.). The above thermal treatment may be step-by-step thermal treatment. For example, in the case of using ammonium bicarbonate as the pore-forming agent, the product obtained after step (d) may be firstly thermally treated at 40° C. to 50° C. to slowly decompose the ammonium bicarbonate, so that the generated bubbles will not largely aggregate in the first inorganic separation layer to form large bubbles and avoid the formation of wedge-shaped pores or pores with a large diameter in the first inorganic separation layer during the escape process of bubbles. Then, the product is thermally treated at 70° C. to 80° C., to completely decompose the ammonium bicarbonate and allow the bubbles to rapidly penetrate the inorganic separation layer. By selecting the type of the pore-forming agent and appropriately adjusting the temperature of thermal treatment in step (e) according to the type of the pore-forming agent, the generated gas can be made to escape along gaps in the first inorganic separation layer and the second inorganic separation layer without being combined into large bubbles, and push off the inorganic particles on both sides of the gap when penetrating through the first inorganic separation layer and the second inorganic separation layer to form fine pores with a pore diameter of 300 nm to 600 nm in the inorganic separation layer. The pores extend from the first inorganic separation layer toward the second inorganic separation layer and penetrate through the second inorganic separation layer, and the pores in the second inorganic separation layer are uniform in diameter.

In the preparation method of the electrode sheet of the present application, the pore-forming agent is added only in the first inorganic separation layer, the type of the pore-forming agent is selected, and the temperature of thermal treatment in step (e) is appropriately adjusted according to the type of the pore-forming agent. Therefore, it is possible to avoid the formation of wedge-shaped pores that occur when a pore-forming agent is added to a single-layer inorganic separation layer, and a plurality of pores each extending from the first inorganic separation layer toward the second inorganic separation layer and penetrating through the second inorganic separation layer and having a relatively uniform diameter ranging from 300 nm to 600 nm can be formed. Therefore, the secondary battery including the electrode sheet of this embodiment has excellent mass energy density as well as low self-discharge rate and resistance.

To facilitate the preparation of the electrode sheet including the first inorganic separation layer and the second inorganic separation layer of this embodiment, the contents of the inorganic particles, the first binder, the first dispersant, and the pore-forming agent in the slurry for forming the first inorganic separation layer may be 35 wt % to 45 wt %, 1 wt % to 4 wt %, 45 wt % to 55 wt % and 5 wt % to 10 wt % respectively.

The contents of the second inorganic particles, the second binder and the second dispersant in the slurry for forming the second inorganic separation layer are respectively 40 to 55 wt %, 1 to 5 wt %, and 40 to 55 wt %.

In the present application, the content of the pore-forming agent in the slurry for forming the first inorganic separation layer may be 5 wt % to 9 wt %, 5 wt % to 9.5 wt %, 5 wt % to 9.9 wt %, 5 wt % to 7 wt %, 6 wt % to 9.5 wt %, and 7 wt % to 9.9 wt %.

To further improve the mass energy density of the battery, the method for preparing the electrode sheet may further include a step of pressing after step (a) and/or step (e). By pressing the active material layer or the inorganic separation layer, the volume of the electrode sheet is reduced, thereby increasing the mass energy density of the battery.

As described above, to improve the mass energy density of the battery and ensure the insulation, the sum of the thicknesses of the first inorganic separation layer and the second inorganic separation layer is 7 μm to 30 μm. Optionally, the sum of the thicknesses of the first inorganic separation layer and the second inorganic separation layer may be 8 μm to 25 μm, 9 μm to 23 μm, 10 μm to 20 μm, 12 μm to 18 μm or 15 μm to 20 μm. In the case where the step of pressing is performed after step (a) and/or step (e), the sum of the thicknesses of the first inorganic separation layer and the second inorganic separation layer refers to the sum of the thicknesses after pressing.

As described above, the sum of the thicknesses of the first inorganic separation layer and the second inorganic separation layer of this embodiment falls within the above-mentioned range, so the mass energy density of the battery can be remarkably improved while ensuring the insulation.

As described above, to form a plurality of pores each extending from the first inorganic separation layer toward the second inorganic separation layer and penetrating through the second inorganic separation layer and having a relatively uniform diameter ranging from 300 nm to 600 nm easily, the thickness of the first inorganic separation layer may be 2 μm to 10 μm. Optionally, the thickness of the first inorganic separation layer may be 2 μm to 9 μm, 3 μm to 8 μm, 4 μm to 7 μm, 3 μm to 5 μm, 4 μm to 6 μm or 5 μm to 10 μm.

As described above, the thickness of the first inorganic separation layer according to this embodiment falls into the above range, whereby a plurality of pores extending from the first inorganic separation layer toward the second inorganic separation layer and penetrating through the second inorganic separation layer and having a relatively uniform diameter ranging from 300 nm to 600 nm are easily formed. Therefore, the secondary battery including the electrode sheet of this embodiment has excellent mass energy density as well as low self-discharge rate and resistance.

As described above, to improve the mass energy density of the battery and ensure the insulation and excellent mechanical performances, each of the first inorganic separation layer and the second inorganic separation layer has a porosity of 40% to 55%.

As described above, the porosity of the first inorganic separation layer and the second inorganic separation layer of this embodiment falls within the above-mentioned range, whereby the mass energy density of the battery is improved, and the insulation and excellent mechanical performances are ensured.

As described above, to improve the mass-energy density of the battery and increase the ionic conductivity of the electrode sheet, the volume-based median particle diameter Dv50 of the inorganic particles may be 30 nm to 500 nm.

As described above, the volume-based median diameter Dv50 of the inorganic particles in this embodiment falls within the above range, to improve the mass energy density of the battery and improve the ionic conductivity of the electrode sheet (thereby reducing the impedance of the electrode sheet).

As described above, in this embodiment, the type of the inorganic particles is not particularly limited. For example, the inorganic particles include at least one selected from the group consisting of silica, alumina, boehmite, magnesia, titania, zinc oxide, and magnesium aluminate oxide. Optionally, the inorganic particles may include at least one selected from the group consisting of boehmite and magnesium aluminate oxide.

As described above, in this embodiment, the type of the binder is not particularly limited. For example, the binder includes at least one selected from the group consisting of carboxymethyl cellulose, polyvinylidene fluoride, styrene butadiene rubber, polyimide, polyethylene, and polyvinylidene fluoride-hexafluoropropylene copolymer. Optionally, the binder may include at least one selected from the group consisting of carboxymethyl cellulose, polyvinylidene fluoride and styrene butadiene rubber.

To facilitate the formation of a slurry suitable for coating and operation without impairing the battery performance, each of the first dispersant and the second dispersant comprises at least one selected from the group consisting of water, methanol, ethanol, n-propanol, isopropanol, acetone, and N-methylpyrrolidone. The dispersant can vary depending on the type of the electrode sheet used. For example, when used for a positive electrode sheet, the dispersant can be N-methylpyrrolidone; and when used for a negative electrode sheet, the dispersant can be water.

To form penetrating pores in the first inorganic separation layer and the second inorganic separation layer during the pore-forming stage, the pore-forming agent needs to be a substance having a pore-forming temperature that is lower than the evaporation temperature of the dispersant. If the pore-forming temperature of the pore-forming agent is higher than the evaporation temperature of the dispersant, the dispersant will be removed earlier during the thermal treatment process, and consequently the inorganic particles will be bound by the binder, causing the gas produced by the pore-forming agent to fail to push off the inorganic particles to form pores in the inorganic separation layer. In this embodiment, the pore forming agent includes at least one selected from the group consisting of ammonium carbonate and ammonium bicarbonate.

In this embodiment, the types of the electrode sheet are not particularly limited. For example, the electrode sheet may be a positive electrode sheet or a negative electrode sheet.

DETAILED DESCRIPTION OF EMBODIMENTS OF THE INVENTION

The secondary battery, the battery module, the battery pack, and the powered device of the present application will be described in detail below with reference to the accompanying drawings.

In an embodiment of the present application, a secondary battery is provided. Typically, the secondary battery includes a positive electrode sheet, a negative electrode sheet, an electrolyte, and a separator. During the charge and discharge process of the battery, lithium ions are intercalated and deintercalated repeatedly between the positive electrode sheet and the negative electrode sheet. The electrolyte serves to conduct lithium ions between the positive electrode sheet and the negative electrode sheet. The separator is provided between the positive electrode sheet and the negative electrode sheet, and mainly functions to prevent a short circuit between the positive electrode and the negative electrode while allowing the ions to pass through. The electrode sheet in the present application includes both an active material layer and an inorganic separation layer as a separator. Therefore, in the preparation of a secondary battery, an electrode sheet (e.g., the positive electrode sheet) of the present application is combined with a corresponding counter electrode sheet (e.g., the negative electrode sheet) to obtain an electrode assembly including the positive electrode sheet, the separator, and the negative electrode sheet. Each constituent element of the secondary battery will be described in detail below.

[Positive Electrode Sheet]

The positive electrode sheet comprises a positive electrode current collector, a positive electrode active material layer provided on at least one surface of the positive electrode current collector, and an inorganic separation layer as described above. The positive electrode active material layer may include a positive electrode active material and an optional binder and conductive agent.

By way of example, the positive electrode current collector has two opposite surfaces in the direction of its own thickness, and the positive electrode active material layer is provided on either or both of the two opposite surfaces of the positive electrode current collector.

In some embodiments, the positive electrode current collector can be a metal foil or a composite current collector. For example, an aluminum foil can be used as the metal foil. The composite current collector may comprise a polymer material substrate and a metal layer formed on at least one surface of the polymer material substrate. The composite current collector can be formed by forming the metal material (for example, aluminium, aluminium alloy, nickel, nickel alloy, titanium, titanium alloy, silver and silver alloy, etc.) on the polymer substrate (such substrate as polypropylene (PP), polyethylene terephthalate (PET), polybutylene terephthalate (PBT), polystyrene (PS), and polyethylene (PE), etc.).

In some embodiments, the positive electrode active material may be a positive electrode active material for batteries known in the art. For example, the positive electrode active material may include at least one of a lithium-containing phosphate of olivine-structure, a lithium transition metal oxide, and a modified compound thereof. However, the present application is not limited to these materials, and other conventional materials useful as positive electrode active materials for secondary batteries can also be used. These positive electrode active materials may be used alone or in combination of two or more thereof. Among them, examples of lithium transition metal oxides may include but are not limited to, at least one of a lithium cobalt oxide (such as $LiCoO_2$), a lithium nickel oxide (such as $LiNiO_2$), a lithium manganese oxide (such as $LiMnO_2$ and $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (also referred to as NCM333), $LiNi_{0.5}Co_{0.2}Mn_{0.3}O_2$ (may also be abbreviated as NCM523), $LiNi_{0.5}Co_{0.25}Mn_{0.25}O_2$ (may also be abbreviated as NCM211), LiNi0.6Co0.2Mn0.2O2 (may also be abbreviated as NCM622), LiNi 0.6 Co 0.2 Mn 0.2 O 2 At least one of 0.8Co0.1Mn0.1O2 (also referred to as NCM811 for short), a lithium nickel cobalt aluminum oxide (such as LiNi0.85Co0.15Al0.05O2) and a modified compound thereof. Examples of the lithium-containing phosphate of olivine-structure may include, but are not limited to, at least one of lithium iron phosphate (such as LiFePO4 (also referred to as LFP)), a composite material of lithium iron phosphate and carbon, lithium manganese phosphate (such as LiMnPO4), a composite material of lithium manganese phosphate and carbon, lithium iron manganese phosphate, and a composite material of lithium manganese iron phosphate and carbon.

In an embodiment of the present application, the positive electrode active material layer may optionally further include other additives such as a lithium supplement. The lithium supplement may include a lithium supplement commonly used in the art. Specifically, the lithium supplement may include at least one of Li6CoO4, Li5FeO4, Li3VO4, Li2MoO3, Li2RuO3, Li2MnO2, Li2NiO2, and Li2CuxNi1-xMy O2, where 0<x≤1, 0≤y<0.1, and M is at least one selected from Zn, Sn, Mg, Fe, and Mn. To improve the specific capacity and rate performance of the secondary battery, especially the rate performance after high-temperature storage, the lithium supplement preferably includes at least one selected from Li6CoO4, Li5FeO4, Li2NiO2, Li2CuO2, and Li2Cu0.6Ni0.4O2.

In some embodiments, the positive electrode active material layer may also optionally include a binder. For example, the binder may include at least one selected from the group consisting of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorine-containing acrylate resin.

In some embodiments, the positive electrode active material layer further optionally comprises a conductive agent. For example, a conductive agent commonly used in the art can be used. The conductive agent may include at least one selected from superconducting carbon, acetylene black, carbon black, Ketjen black, carbon nanotube, carbon nanorod, graphene, and carbon nanofiber.

In some embodiments, the positive electrode active material layer coated on the positive electrode current collector can be prepared by dispersing the components for preparing the positive electrode sheet, for example, the positive electrode active material, the conductive agent, the binder and any other components in a solvent (for example, N-methyl pyrrolidone) to form a positive electrode slurry; and applying the positive electrode slurry on a positive electrode current collector, followed by oven drying, cold pressing and other procedures, to obtain the positive electrode active material layer coated on the positive electrode current collector. Alternatively, in another embodiment, the positive electrode active material layer coated on the positive electrode current collector can be prepared by casting the positive electrode slurry for forming the positive electrode active material layer on a separate carrier, and then laminating a film peeled from the carrier on the positive electrode current collector. After that, an inorganic separation layer can be coated on the positive electrode active material layer following the preparation method of the electrode sheet in the present application.

[Negative Electrode Sheet]

The negative electrode sheet includes a negative electrode current collector, a negative electrode active material layer provided on at least one surface of the negative electrode current collector, and an inorganic separation layer as described above. The negative electrode active material layer comprises a negative electrode active material, and an optional binder, conductive material, and other auxiliaries.

By way of example, the negative electrode current collector has two opposite surfaces in the direction of its own thickness, and the negative electrode active material layer is provided on either or both of the two opposite surfaces of the negative electrode current collector.

In some embodiments, the negative electrode current collector can be a metal foil or a composite current collector. For example, a copper foil can be used as the metal foil. The composite current collector may comprise a polymer material substrate and a metal layer formed on at least one surface of the polymer material substrate. The composite current collector can be formed by forming the metal material (for example, copper, copper alloy, nickel, nickel alloy, titanium, titanium alloy, silver and silver alloy, etc.) on the polymer substrate (such substrate as polypropylene (PP), polyethylene terephthalate (PET), polybutylene terephthalate (PBT), polystyrene (PS), and polyethylene (PE), etc.).

In some embodiments, the negative electrode active material may be a negative electrode active material for batteries known in the art. For example, the negative electrode active material may include at least one of artificial graphite, natural graphite, soft carbon, hard carbon, silicon-based materials, tin-based materials, lithium titanate, and the like. The silicon-based material may be at least one selected from elemental silicon, a silicon-oxygen compound, a silicon-carbon composite, a silicon-nitrogen composite, and a silicon alloy. The tin-based material may be at least one selected from elemental tin, a tin-oxygen compound, and a tin alloy. However, the present application is not limited to these materials, and other conventional materials useful as negative electrode active materials for batteries can also be used. These negative electrode active materials may be used alone or in combination of two or more thereof.

In some embodiments, the negative electrode active material layer may also optionally include a binder. The binder may be at least one selected from styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode active material layer further optionally comprises a conductive agent. The conductive agent may be at least one selected from superconducting carbon, acetylene black, carbon black, Ketjen black, carbon nanotube, carbon nanorod, graphene, and carbon nanofiber.

In some embodiments, the negative electrode active material layer may further optionally comprise other auxiliaries, for example, a thickener (e.g., sodium carboxymethyl cellulose (CMC-Na)) and the like.

In some embodiments, the negative electrode active material layer coated on the negative electrode current collector can be prepared by dispersing the components for preparing the negative electrode sheet, for example, the negative electrode active material, the conductive agent, the binder and any other components in a solvent (for example, deionized water) to form a negative electrode slurry; and applying the negative electrode slurry on a negative electrode current collector, followed by oven drying, cold pressing and other procedures, to obtain the negative electrode active material layer coated on the negative electrode current collector. Alternatively, in another embodiment, the negative electrode active material layer can be prepared by casting the negative electrode slurry for forming the negative electrode active material layer on a separate carrier, and then laminating a film peeled from the carrier on the negative electrode current collector. After that, an inorganic separation layer can be coated on the negative electrode active material layer following the preparation method of the electrode sheet in the present application.

[Electrolyte]

The electrolyte serves to conduct ions between the positive electrode sheet and the negative electrode sheet. The type of the electrolyte is not particularly limited in the present application, and can be selected according to needs. For example, the electrolyte may be in a liquid or gel state.

In addition, the electrolyte according to the embodiment of the present application includes an additive. The additive may include an additive commonly used in the art. The additive may include, for example, halogenated alkylene carbonates (e.g., ethylene difluorocarbonate), pyridine, triethyl phosphite, triethanolamine, cyclic ethers, ethylenediamine, ethylene glycol dimethyl ether, hexamethylphosphoric triamide, nitrobenzene derivatives, sulfur, quinoneimine dyes, N-substituted oxazolidinones, N,N-substituted imidazolidines, ethylene glycol dialkyl ethers, ammonium salts, pyrrole, 2-methoxyethanol or aluminum trichloride. In this case, based on the total weight of the electrolyte, the additive may be included in an amount of 0.1 wt % to 5 wt % or the amount of the additive may be adjusted by those skilled in the art according to actual needs.

In some embodiments, an electrolyte solution is used as the electrolyte. The electrolyte solution comprises an electrolyte salt and a solvent.

In some embodiments, the electrolyte salt can be at least one selected from lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalato)borate, lithium difluoro bis(oxalato)phosphate, and lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the secondary battery may include an outer package. The outer package can be used to encapsulate the above-mentioned electrode assembly and electrolyte.

In some embodiments, the outer package of the secondary battery may be a hard case, such as a hard plastic case, an aluminium case, a steel case, and the like. The outer package of the secondary battery can also be a soft pack, such as a bag-type soft pack. The material of the soft pack can be a plastic. Examples of the plastic include polypropylene, polybutylene terephthalate and polybutylene succinate, etc.

The shape of the secondary battery is not particularly limited in the present application, and may be cylindrical, square or of any other shapes. For example, FIG. 1 shows an example of a secondary battery 5 having a square structure.

Figure 2:
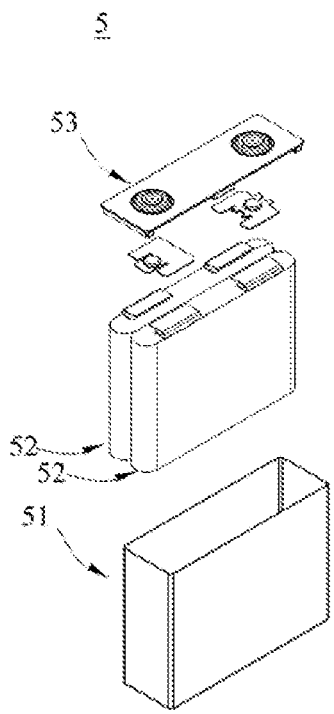
FIG. 2 is an exploded view of the secondary battery according to the embodiment of the present application shown in FIG. 1.

In some embodiments, referring to FIG. 2, the outer package may include a case 51 and a cover plate 53. Here, the case 51 includes a bottom plate and a side plate connected to the bottom plate, where the bottom plate and the side plate defines an accommodating cavity. The case 51 has an opening that communicates with the accommodating cavity, and the cover plate 53 can cover the opening to close the accommodating cavity. The positive electrode sheet, the negative electrode sheet, and the separator may be formed into an electrode assembly 52 by a winding process or a lamination process. The electrode assembly 52 is encapsulated within the accommodating cavity. The electrolyte solution impregnates the electrode assembly 52. The number of electrode assemblies 52 contained in the secondary battery 5 can be one or more, and can be selected by those skilled in the art according to actual needs.

In some embodiments, secondary batteries can be assembled into a battery module, the number of secondary batteries contained in the battery module can be one or more, and the specific number can be selected by those skilled in the art according to the application and capacity of the battery module.

Figure 3:
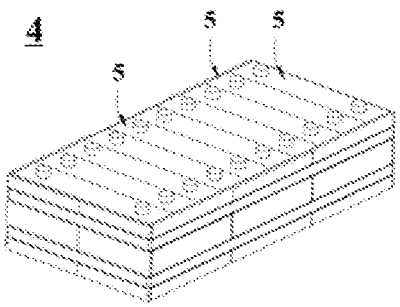
FIG. 3 is a schematic view of a battery module according to an embodiment of the present application.

FIG. 3 shows an example of a battery module 4. Referring to FIG. 3, in the battery module 4, a plurality of secondary batteries 5 is sequentially arranged along the length direction of the battery module 4. Of course, any other arrangement of the plurality of secondary batteries 5 is also possible. Further, the plurality of secondary batteries 5 may further be fixed by fasteners.

Optionally, the battery module 4 may further include a shell having an accommodating space, in which the plurality of secondary batteries 5 are accommodated.

In some embodiments, the above-mentioned battery modules can further be assembled into a battery pack. The number of battery module contained in the battery pack may be one or more, and can be selected by those skilled in the art according to the use and capacity of the battery pack.

Figure 4:
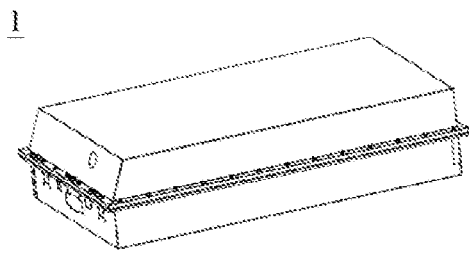
FIG. 4 is a schematic view of a battery pack according to an embodiment of the present application.
Figure 5:
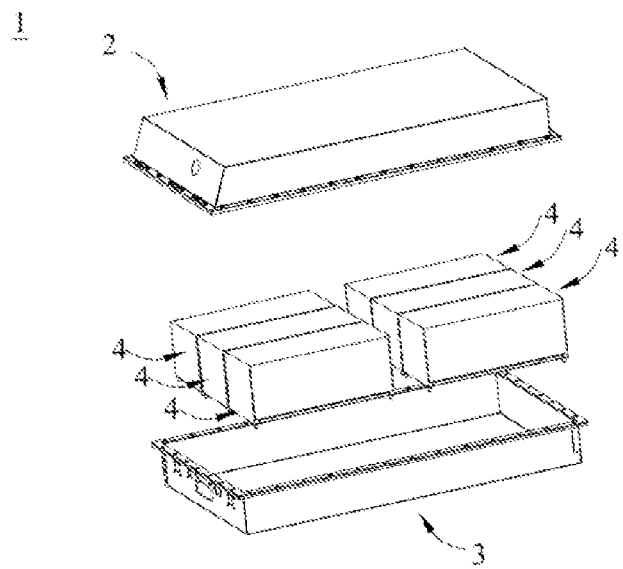
FIG. 5 is an exploded view of the battery pack according to the embodiment of the present application shown in FIG. 4.

FIGS. 4 and 5 show an example of a battery pack 1. Referring to FIGS. 4 and 5, the battery pack 1 may include a battery box and a plurality of battery modules 4 provided in the battery box. The battery box includes an upper box 2 and a lower box 3, where the upper box 2 can cover the lower box 3, and defines an enclosed space for accommodating the battery module 4. The plurality of battery modules 4 can be arranged in the battery box in any pattern.

In addition, the present application further provides a powered device, and the powered device includes at least one of the secondary battery, the battery module, or the battery pack provided in the present application. The secondary battery, battery module, or battery pack can be used as a power source for the powered device, and can also be used as an energy storage unit for the powered device. The powered device may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the powered device, the secondary battery, the battery module, or the battery pack can be selected according to the requirements during use.

Figure 6:
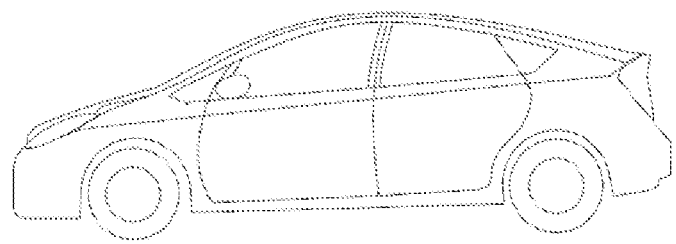
FIG. 6 is a schematic view of a powered device using a secondary battery according to an embodiment of the present application.

FIG. 6 is an example of powered device. The powered device is an all-electric vehicle, a hybrid electric vehicle, or a plug-in hybrid electric vehicle, etc. In order to meet the requirements of the powered device for high power and high energy density of secondary batteries, a battery pack or a battery module may be used.

The device may also be, for example, a mobile phone, a tablet computer, and a laptop, etc. The device is generally required to be light and thin, and can use a secondary battery as a power source.

EXAMPLES

Examples of the present invention will be described in detail hereinafter. The examples described below are exemplary and only used to explain the present application, and should not be construed as a limitation on the present application. Where specific techniques or conditions are not indicated in the examples, the techniques or conditions described in the literatures in the art or described in the product specifications are followed. Where the manufacturers are not specified, the reagents or instruments used are conventional products and are commercially available.

Example 1

(1) Preparation of Positive Electrode Sheet

The positive active material lithium iron phosphate, the binder polyvinylidene fluoride (PVDF), and the conductive agent acetylene black were dissolved at a weight ratio of 97:2:1 in the solvent N-methylpyrrolidone (NMP). The mixture was well mixed by fully stirring to form a positive electrode slurry, and then the positive electrode slurry was uniformly coated on an aluminum foil that is a positive electrode current collector. After drying and cold pressing, a positive electrode active material layer was obtained. Then, boehmite (having a volume-based median particle diameter Dv50 of 200 nm) as first inorganic particle, ammonium bicarbonate as a pore forming agent, NMP as a dispersant, and styrene butadiene rubber (SBR) as a binder were mixed at a weight ratio of 40:8:50:2 was mixed and dispersed sufficiently to obtain a slurry for forming a first inorganic separation layer. Then, the slurry was coated on the positive electrode active material layer, and the obtained product was dried in an oven at 30° C. to remove 40 wt % of NMP. Then, a slurry for forming a second inorganic separation layer was applied on the obtained preliminary dried first inorganic separation layer, wherein the slurry includes boehmite (having a volume-based median particle diameter Dv50 of 200 nm) as second inorganic particles, SBR as a second binder, and NMP as a second dispersant at a weight ratio of 48:2:50. After that, the obtained product was thermally treated at 50° C. to form pores. Thus a positive electrode sheet was obtained. The physical parameters of the positive electrode sheet are shown in Table 1 below.

(2) Preparation of Negative Electrode Sheet

The negative electrode active material artificial graphite, the conductive agent acetylene black, the binder styrene butadiene rubber (SBR), and the thickener sodium carboxymethyl cellulose (CMC-Na) are dissolved in the solvent deionized water at a weight ratio of 95:2:2:1, and mixed uniformly with the solvent deionized water to prepare a negative electrode slurry. Then, the negative electrode slurry was uniformly coated on a copper foil as a negative electrode current collector, and then dried, cold pressed, and cut to obtain a negative electrode sheet.

(3) Preparation of Electrolyte Solution

In a glove box under an argon atmosphere (where $H_2O<0.1$ ppm, and $O_2<0.1$ ppm), $LiPF_6$ was dissolved in an organic solvent (EC/DMC/EMC=1/1/1 (weight ratio)) to give a concentration of 1 mol/L, and then electrolyte additives as shown in Table 1 below were added, and stirred to obtain a corresponding electrolyte solution.

(4) Preparation of Secondary Battery

The positive and negative electrode sheets were stacked in such a manner that one layer of the positive electrode sheet was stacked on one layer of the negative electrode sheet, to allow the inorganic separation layer functioning as the separator to serve for isolation between the positive and negative active material layers. Then an electrode assembly was obtained from multi-layer stacked positive and negative electrode sheets. The electrode assembly was placed in an aluminum-plastic film bag as a battery case and dried. Then, the electrolyte solution was injected, and a secondary battery was prepared after formation, standing and other processes.

Examples 2 to 6 and Comparative Examples 1 to 4

The secondary batteries of Examples 2 to 6 and Comparative Examples 1 to 4 were prepared following the same method as described in Example 1, except that the coating amount of the slurry was adjusted to adjust the thickness of the inorganic separation layer and the content of the pore-forming agent in the first inorganic separation layer and the second inorganic separation layer was adjusted, as shown in Table 1 below.

Example 7

The secondary battery of Example 7 was prepared following the same method as described in Example 1, except that the electrode sheet was cold-pressed (under a pressure of 10 t) after step (a) in the preparation process.

Next, the test methods of the electrode sheet are described.

(2) Test Method of Pore Diameter

According to the standard GB/T1967-1966, the pore diameter of the electrode sheet obtained was determined by JW-K pore diameter analyzer (Beijing Jingwei Gaobo Science and Technology Co., Ltd.).

(2) Test Method for the Porosity of the First Inorganic Separation Layer and the Second Inorganic Separation Layer The porosity of the first inorganic separation layer and the second inorganic separation layer was determined by boiling in water. Specifically, the dry weight $m0$ of a sample of the inorganic separation layer, the suspended weight $m1$ of the saturated sample in water and the weight $m2$ of the saturated sample were determined, and the porosity was calculated by the formula $P=(m2-m0)/(m2-m1)$.

TABLE 1

Electrode sheet parameters and battery performance

| N.: | Thickness of the first inorganic separation layer (μm) | Thickness of the second inorganic separation layer (μm) | Pore diameter of the pores (nm) | Porosity (%) of the first and second inorganic separation layers | Pore forming temperature (° C.) | K value (mv/h) | Specific capacity (Wh/kg) | Impedance (mohm) |
|---|---|---|---|---|---|---|---|---|
| Example 1 | 2 | 8 | 300 | 42% | 50 | 0.026 | 240.00 | 123 |
| Example 2 | 6 | 8 | 350 | 45% | 50 | 0.027 | 226.80 | 125 |
| Example 3 | 10 | 8 | 400 | 51% | 50 | 0.029 | 224.10 | 128 |
| Example 4 | 10 | 20 | 410 | 49 | 50 | 0.028 | 213.30 | 138 |
| Example 5 | 13 | 8 | 420 | 52 | 50 | 0.030 | 220.70 | 129 |
| Example 6 | 10 | 30 | 410 | 45% | 50 | 0.028 | 205.71 | 149% |
| Example 7 | 2 | 8 | 250 | 40 | 50 | 0.024 | 240.00 | 124 |
| Comparative Example 1 | 2 | 3 | 280 | 4/4 | 50 | 0.135 | 235.10 | 115 |
| Comparative Example 2 | 14 (only one inorganic separation layer) | | 500 (wedge-shaped pores, where the pore diameter refers to the pore diameter at an end with a larger opening) | 53% | 50 | 0.107 | 227.77 | 128 |
| Comparative Example 3 | 14 (only one inorganic separation layer) | | Substantially no penetrating pores, and only gaps between the inorganic particles are present | 35% | 50 | 0.032 | 224.20 | 134 |
| Comparative Example 4 | 10 | 20 | 700 | 51% | 50 | 0.091 | 216 | 131 |

Next, the test methods of the secondary battery are described.

(1) Determination of K Value

At a test temperature of 50° C., the open circuit voltage OCV1 (voltage 1) of the secondary battery was determined. Then, the battery was placed in a constant-temperature oven at 50° C. for 24 hrs, and the open circuit voltage OCV2 of the secondary battery was determined. The K value of the secondary battery was calculated by the formula K=(ocv2−ocv1)/24. The K value represents the magnitude of the battery's self-discharge rate. The measurement results are shown in Table 1 above.

i. Determination of Specific Capacity

At 25° C., the lithium-ion battery was charged at a constant current of 0.33C to 3.65V, and then charged at a constant voltage of 3.65V until the current was less than 0.05C. Then the lithium-ion battery was discharged at a constant current of 0.33C to 2.5V. The actual capacity was recorded. The specific capacity of the lithium-ion battery was calculated from the measured actual capacity and the weight of the battery. The results are shown in Table 1 above.

ii. Measurement of Battery Impedance

The impedance of the secondary batteries obtained in the above examples and comparative examples was tested by the WK65120B tester according to the DC internal resistance test method. The measurement results are shown in Table 1 above.

It can be seen from the comparison between Example 2 and Comparative Example 3 in Table 1 above that when the thickness of the inorganic separation layer is constant, the mass energy density of the battery can be increased by forming holes in the inorganic separation layer. It can be seen from the comparison between Example 3 and Example 5 in Table 1 above that when the thickness of the first inorganic separation layer is too large, the energy density of the battery will decrease and the impedance and self-discharge rate will increase to a certain extent. Therefore, the thickness of the first inorganic separation layer is preferably in the range of 2 μm to 10 μm.

From the comparison of Examples 1 and 3 with Comparative Examples 1 and 6 in the above Table 1, it can be seen that when the sum of the thicknesses of the first inorganic separation layer and the second inorganic separation layer is smaller, the self-discharge rate of the battery increases significantly. Conversely, when the sum of the thicknesses of the first inorganic separation layer and the second inorganic separation layer is larger, the impedance of the battery increases and the mass energy density decreases significantly. Therefore, the sum of the thicknesses of the first inorganic separation layer and the second inorganic separation layer is preferably in the range of 7 μm to 30 μm.

From the comparison of Example 2 and Comparative Example 2 in the above Table 1, it can be seen that when a pore-forming agent is added to the entire inorganic separation layer in the pore-forming stage, wedge-shaped pores will be formed in the inorganic separation layer. Moreover, with constant thickness of the inorganic separation layer, the pore diameter at an end with a larger opening of the wedge-shaped pores is obviously larger than the pore diameter in Example 2 of the present application. Correspondingly, this results in a significant increase in the self-discharge rate of the battery. Therefore, in the present application, it is preferable to add a pore-forming agent to the first inorganic separation layer to form pores in the first inorganic separation layer and the second inorganic separation layer, for the purpose of forming pores with a uniform pore diameter in the second inorganic separation layer.

From the comparison of Example 4 and Comparative Example 4 in Table 1 above, it can be seen that when pores with a diameter larger than 600 nm are formed in the second inorganic separation layer, the self-discharge rate of the battery is significantly increased. Therefore, the diameter of the pores in the inorganic separation layer is preferably 300 nm to 600 nm.

From Examples 1~4 in Table 1 above, it can be seen that when the thickness of the first inorganic separation layer, the sum of the thicknesses of the first inorganic separation layer and the second inorganic separation layer, the porosity of the inorganic separation layer and the diameter of the pores are all within the ranges defined in the present application, the secondary battery of the present application has excellent mass energy density as well as low self-discharge rate and impedance.

From the comparison of Examples 1 and 7 in Table 1 above, it can be seen that the energy density of the secondary battery can be improved by pressing the electrode sheet.

It should be noted that the present application is not limited to the above-mentioned embodiments. The above-described embodiments are merely exemplary, and embodiments having substantially the same technical idea and the same effects within the scope of the technical solution of the present application are all included in the technical scope of the present application. In addition, other embodiments constructed by applying various modifications conceivable to those skilled in the art to the embodiments and combining some of the constituent elements of the embodiments are also included in the scope of the present application.

The invention claimed is:

1. An electrode sheet, comprising:
   a current collector;
   an active material layer provided on at least one surface of the current collector;
   a first inorganic separation layer formed on the active material layer, the first inorganic separation layer comprising 90 wt % to 95 wt % of first inorganic particles and a first binder having a content of 5 wt % to 10 wt %; and
   a second inorganic separation layer formed on the first inorganic separation layer, the second inorganic separation layer comprising 95 wt % to 98 wt % of second inorganic particles and a second binder having a content of 2 wt % to 5 wt %,
   wherein, the first inorganic separation layer comprises a plurality of pores having a diameter of 300 nm-600 nm,
   the content of the second binder in the second inorganic separation layer is less than the content of the first binder in the first inorganic separation layer,
   each of the plurality of pores extends from the first inorganic separation layer toward the second inorganic separation layer and penetrates through the second inorganic separation layer, and
   the diameter of the pores in the second inorganic separation layer is uniform.

2. The electrode sheet according to claim 1, wherein the sum of thicknesses of the first inorganic separation layer and the second inorganic separation layer is 7 μm to 30 μm.

3. The electrode sheet according to claim 2, wherein a thickness of the first inorganic separation layer is 2 μm to 10 μm.

4. The electrode sheet according to claim 1 wherein each of the first inorganic separation layer and the second inorganic separation layer has a porosity of 40% to 55%.

5. The electrode sheet according to claim 1, wherein the volume-based median diameter Dv50 of the inorganic particles is 30 nm to 500 nm.

6. The electrode sheet according to claim 1, wherein the first and second inorganic particles comprise at least one selected from the group consisting of silica, alumina, boehmite, magnesia, titania, zinc oxide, and magnesium aluminate oxide.

7. The electrode sheet according to claim 1, wherein the first and second binder comprise at least one selected from the group consisting of carboxymethyl cellulose, polyvinylidene fluoride, styrene butadiene rubber, polyimide, polyethylene, and polyvinylidene fluoride-hexafluoropropylene copolymer.

8. A secondary battery, comprising an electrode sheet according to claim 1.

9. A method for preparing an electrode sheet, comprising the following:
   (a) coating an active material layer on at least one surface of a current collector,
   (b) coating a slurry for forming a first inorganic separation layer on the active material layer, the slurry comprising first inorganic particles, a first binder, a first dispersant and a pore-forming agent,
   (c) drying the coated slurry for forming the first inorganic separation layer at a temperature lower than a pore-forming temperature of the pore-forming agent to remove 30 wt % to 60 wt % of the first dispersant,
   (d) coating a slurry for forming a second inorganic separation layer on the preliminarily dried first inorganic separation layer obtained after step (c), the slurry comprising second inorganic particles, a second binder and a second dispersant, and
   (e) thermally treating the product obtained after step (d) at the pore-forming temperature of the pore-forming agent to obtain an electrode sheet including the current collector, the active material layer, the first inorganic separation layer and the second inorganic separation layer, wherein,
   in the first inorganic separation layer, the first inorganic particles have a content of 90 wt % to 95 wt %, and the first binder has a content of 5 wt % to 10 wt %,
   in the second inorganic separation layer, the second inorganic particles have a content of 95 wt % to 98 wt %, and the first binder has a content of 2 wt % to 5 wt %,
   the content of the second binder in the second inorganic separation layer is less than the content of the first binder in the first inorganic separation layer,
   the first inorganic separation layer comprises a plurality of pores having a diameter of 300 nm-600 nm,
   each of the plurality of pores extends from the first inorganic separation layer toward the second inorganic separation layer and penetrates through the second inorganic separation layer, and
   the diameter of the pores in the second inorganic separation layer is uniform.

10. The method for preparing an electrode sheet according to claim 9, wherein the contents of the first inorganic particles, the first binder, the first dispersant and the pore-forming agent in the slurry for forming the first inorganic separation layer are respectively 35 to 45 wt %, 1 to 4 wt %, 45 to 55 wt %, and 5 to 10 wt %; and
   the contents of the second inorganic particles, the second binder and the second dispersant in the slurry for forming the second inorganic separation layer are respectively 40 to 55 wt %, 1 to 5 wt %, and 40 to 55 wt %.

11. The method for preparing an electrode sheet according to claim 9, further comprising a step of pressing after step (a), or after step (e), or after both step (a) and step (b).

12. The method for preparing an electrode sheet according to claim 9, wherein the sum of the thicknesses of the first inorganic separation layer and the second inorganic separation layer is 7 μm to 30 μm.

13. The method for preparing an electrode sheet according to claim 9, wherein a thickness of the first inorganic separation layer is 2 μm to 10 μm.

14. The method for preparing an electrode sheet according to claim 9, wherein each of the first inorganic separation layer and the second inorganic separation layer has a porosity of 40% to 55%.

15. The method for preparing an electrode sheet according to claim 9, wherein the volume-based median diameter Dv50 of each of the first inorganic particles and the second inorganic particles is 30 nm to 500 nm.

16. The method for preparing an electrode sheet according to claim 9, wherein each of the first inorganic particles and the second inorganic particles comprises at least one selected from the group consisting of silica, alumina, boehmite, magnesia, titania, zinc oxide, and magnesium aluminate oxide.

17. The method for preparing an electrode sheet according to claim 9, wherein each of the first binder and the second binder comprises at least one selected from the group consisting of carboxymethyl cellulose, polyvinylidene fluoride, styrene butadiene rubber, polyimide, polyethylene, and polyvinylidene fluoride-hexafluoropropylene copolymer.

18. The method for preparing an electrode sheet according to claim 9, wherein the pore-forming agent comprises at least one selected from the group consisting of ammonium carbonate and ammonium bicarbonate.

* * * * *